(12) United States Patent
Püntener et al.

(10) Patent No.: US 10,065,836 B2
(45) Date of Patent: Sep. 4, 2018

(54) METHOD AND DEVICE FOR INSTALLING AN ELEVATOR SYSTEM

(71) Applicant: Inventio AG, Hergiswil (CH)

(72) Inventors: Urs Püntener, Shanghai (CN); Stefan Buntschu, New South Wales (AU)

(73) Assignee: INVENTIO AG, Hergiswil (CH)

( * ) Notice: Subject to any disclaimer, the term of this patent is extended or adjusted under 35 U.S.C. 154(b) by 157 days.

(21) Appl. No.: 15/106,355

(22) PCT Filed: Dec. 16, 2014

(86) PCT No.: PCT/EP2014/077867
§ 371 (c)(1),
(2) Date: Jun. 20, 2016

(87) PCT Pub. No.: WO2015/091419
PCT Pub. Date: Jun. 25, 2015

(65) Prior Publication Data
US 2017/0001842 A1 Jan. 5, 2017

(30) Foreign Application Priority Data
Dec. 19, 2013 (EP) .................................... 13198267

(51) Int. Cl.
*B66B 19/00* (2006.01)
*G01C 15/10* (2006.01)
(52) U.S. Cl.
CPC ............ *B66B 19/002* (2013.01); *G01C 15/10* (2013.01)
(58) Field of Classification Search
CPC .................................................. B66B 19/002

USPC .......................................... 33/333, 391, 645
See application file for complete search history.

(56) References Cited

U.S. PATENT DOCUMENTS

| | | | |
|---|---|---|---|
| 1,874,057 A * | 8/1932 | Murphy ................. | G01C 15/10 33/370 |
| 2,402,888 A | 6/1946 | Hall | |
| 3,335,635 A | 8/1967 | Sidler | |
| 4,495,707 A * | 1/1985 | Rousey ................. | G01C 15/10 33/392 |
| 4,819,403 A * | 4/1989 | Penicaut ............... | B66B 13/303 33/194 |
| 5,003,701 A * | 4/1991 | Hughes ............... | E04G 21/1808 33/404 |

(Continued)

FOREIGN PATENT DOCUMENTS

| | | |
|---|---|---|
| JP | H0632556 A | 2/1994 |
| JP | H1087225 A | 4/1998 |

(Continued)

*Primary Examiner* — Christopher Fulton
(74) *Attorney, Agent, or Firm* — William J. Clemens; Shumaker, Loop & Kendrick LLP

(57) ABSTRACT

A method for installing a component of an elevator system having an elevator shaft involves the steps of: mounting a positioning frame in the elevator shaft in relation to a wall of the elevator shaft; attaching a guide line in the elevator shaft separately from the positioning frame; aligning the guide line using the positioning frame; and aligning the component using the aligned guide line. A device for carrying out the method includes the guide line, the positioning frame having positioning aids for the guide line and an adjustable fastener for attaching the guide line in the elevator shaft.

12 Claims, 3 Drawing Sheets

(56) References Cited

U.S. PATENT DOCUMENTS

| | | | | |
|---|---|---|---|---|
| 6,422,352 | B1* | 7/2002 | Pettersson | B66B 19/002 187/408 |
| 6,976,316 | B1* | 12/2005 | Patterson | G01C 15/10 33/365 |
| 7,036,235 | B1* | 5/2006 | Cohen | G01C 15/10 33/371 |
| 2005/0193580 | A1* | 9/2005 | Alecci | G01C 15/10 33/392 |
| 2008/0072441 | A1* | 3/2008 | Charpentier | E04G 21/1825 33/407 |
| 2011/0067252 | A1* | 3/2011 | Van Der Meijden | B66B 19/002 33/404 |
| 2016/0060078 | A1* | 3/2016 | Mertala | B66B 19/002 52/741.1 |

FOREIGN PATENT DOCUMENTS

| | | | | |
|---|---|---|---|---|
| JP | 10218530 | A * | 8/1998 | ........... B66B 19/002 |
| JP | 201163546 | A | 6/2001 | |
| JP | 2001322776 | A | 11/2001 | |
| JP | 2004256216 | A * | 9/2004 | ........... B66B 19/002 |
| JP | 2008024387 | A | 2/2008 | |
| JP | 2010070268 | A | 4/2010 | |
| WO | 0194884 | A1 | 12/2011 | |

\* cited by examiner

Detail A-A

METHOD AND DEVICE FOR INSTALLING AN ELEVATOR SYSTEM

FIELD

The invention relates to a method of installing a component of an elevator installation and to a device for aligning this component.

BACKGROUND

When installing components of an elevator installation in an elevator shaft and, in particular, when installing guide rails, use is made of devices for alignment of such components. Such devices are usually termed positioning templates. A positioning frame of this device is arranged and fixed in the shaft head of the elevator shaft. The positioning frame has markings at which guide lines can be fastened. The guide lines are tensioned along the elevator shaft. The guide lines aligned in that way serve for orientation at the time of installing the individual guide rails or the individual components. The alignment of the positioning frame is usually carried out with respect to the individual shaft door openings of the elevator shaft. Accordingly, components of the shaft doors can be installed with the help of these guide lines having a defined arrangement. In order to be able to ensure sufficient precision in the positioning of the guide lines, such guide lines are provided with a tension.

The guide lines can be tensioned by means of, for example, plumb-bobs. As an alternative to tensioning by means of plumb-bobs, a second positioning frame can be arranged and fixed in a shaft pit of the elevator shaft. The guide lines are fixed to this second positioning frame just as they were already fixed to the first-mentioned aforesaid positioning frame. It is disadvantageous that due to guide lines fixed to the positioning frame it is necessary for the or each positioning frame to have increased stability. Accordingly, the or each positioning frame has to be sufficiently strongly constructed so as not to be deformed as a consequence of the action of force due to the guide lines. Consequently, a corresponding device for alignment of such a component is relatively expensive.

On the other hand, it is usual for elevator installations to be installed along the elevator shaft in sections. This means, for example, that the guide rails are already installed in a lower region of the elevator shaft and in addition other installing operations independent of the device for alignment of the component are already carried out in this lower region of the elevator installation. Consequently, the guide lines are removed in this lower region of the elevator shaft. Accordingly, for installing the guide rails arranged at the top in the elevator shaft the device is arranged merely in this upper region of the elevator shaft. The plumb-bobs which, for example, hang from above in the elevator shaft accordingly represent a risk to persons present in the elevator shaft.

SUMMARY

It is therefore an object of the invention to indicate a simplified device for alignment of an elevator installation component, by means of which device it is possible to guarantee the safety of persons present in the elevator shaft.

The object is fulfilled by a method of installing a component of an elevator installation comprising an elevator shaft, the method comprising the following method steps:

aligning and fixing a positioning frame in the elevator shaft with respect to a wall of the elevator shaft, which wall bounds the elevator shaft, fixing a guide line in the elevator shaft, wherein the guide line is fixed in the elevator shaft separately from the positioning frame, aligning the guide line by means of the aligned and fixed positioning frame and aligning the component by means of the aligned guide line.

The object is equally fulfilled by a device for aligning a component of an elevator installation when installing this component, the device comprising a positioning frame, which is fixable in the elevator shaft of the elevator installation with respect to a wall, which bounds the elevator shaft, of the elevator shaft, and a guide line which is fixable in the elevator shaft separately from the positioning frame, wherein the positioning frame serves for alignment of the guide line in the elevator shaft.

The device arranged in the elevator shaft serves for aligning the component of the elevator installation during the installing of this component. For this purpose, the positioning frame and the guide line aligned with the help of the positioning frame are fastened in the elevator shaft. Such a guide line can be formed by, for example, a wire or a cable, produced from metal or synthetic fibers. In order to be able to guarantee a rectilinear path of the guide line in the elevator shaft the guide line has to be tensioned along its length. In order to be able to additionally ensure sufficient stability of the positioning frame, but nevertheless save material for the positioning frame, the guide line is fixed not to the positioning frame itself, but in the elevator shaft at a point different from the positioning frame. This means that a first end of the guide line is fixed or fastened to a wall or to the ceiling or floor of the elevator shaft. Alignment of the guide line in the elevator shaft is thus realized exclusively by means of the positioning frame. This means that the section of the guide line between a fastening point of the guide line in the elevator shaft and this positioning frame, by means of which the alignment of the guide line is carried out, is not suitable for alignment of the component. Accordingly, this section is unaligned, thus not aligned. The loading resulting from the tension necessary for the guide line is thus transmitted directly to the structure of the elevator shaft, not to the positioning frame.

In a development of the method the guide line is fixed in the elevator shaft by way of a fastening means. Such a fastening means enables removal of the guide line, without destroying the guide line, after the relevant component has been installed.

The fastening means can be constructed in such a way that the guide line can be loaded with the tension force of at least 300 N. A tension force of the guide line of at least 300 N makes it possible for the guide line to be able to be tensioned in tall elevator shafts.

The fastening means can comprise a base and an arm pivotable at the base, which arm is pivoted so as to align the guide line with respect to the positioning frame. This base is fastenable in the elevator shaft. The path of the guide line at the positioning frame can itself be influenced in such a way and the guide line accordingly preserved.

In a development of the method a first end of the guide line is fixed to the wall of the elevator shaft. The positioning frame can be arranged at any place of the elevator shaft. By means of the fixing of the guide line to the wall of the elevator shaft it is thus made possible for the guide line to be able to be fixed in the immediate vicinity of the positioning frame.

The elevator shaft usually has a plurality of shaft door openings. The positioning frame and the guide line can accordingly be fixed above a lowermost and below an uppermost one of the shaft door openings in the elevator shaft. In this way the elevator installation can be placed in operation in sections. This means, for example, that in the lower region of the elevator shaft the elevator installation is already installed and operationally ready. It is thus made possible that in the case of installing the elevator installation in the upper region the device used for alignment of the component does not in any way intrude into the lower region of the elevator installation. In addition, the section of the guide line intended for alignment of the component can be arranged above the positioning frame. By means of an arrangement of that kind it is made possible for the guide line to be fixed in such a way that persons working in the elevator shaft with the device arranged therein are not exposed to risk of injury.

Instead of the mentioned fixing of the first end of the guide line to the wall of the elevator shaft the first end of the guide line can be fixed to a shaft ceiling of the elevator shaft or to the shaft floor of the elevator shaft. In that way the installing of components can be carried out from the shaft floor towards the shaft ceiling.

In a development of the method the guide line is used for aligning the guide rail, wherein the guide rail is provided for guidance of the elevator car of the elevator installation or for guidance of the counterweight of the elevator installation.

DESCRIPTION OF THE DRAWINGS

The invention is explained in more detail in the following by way of figures, in which.

DETAILED DESCRIPTION

Figure 1:
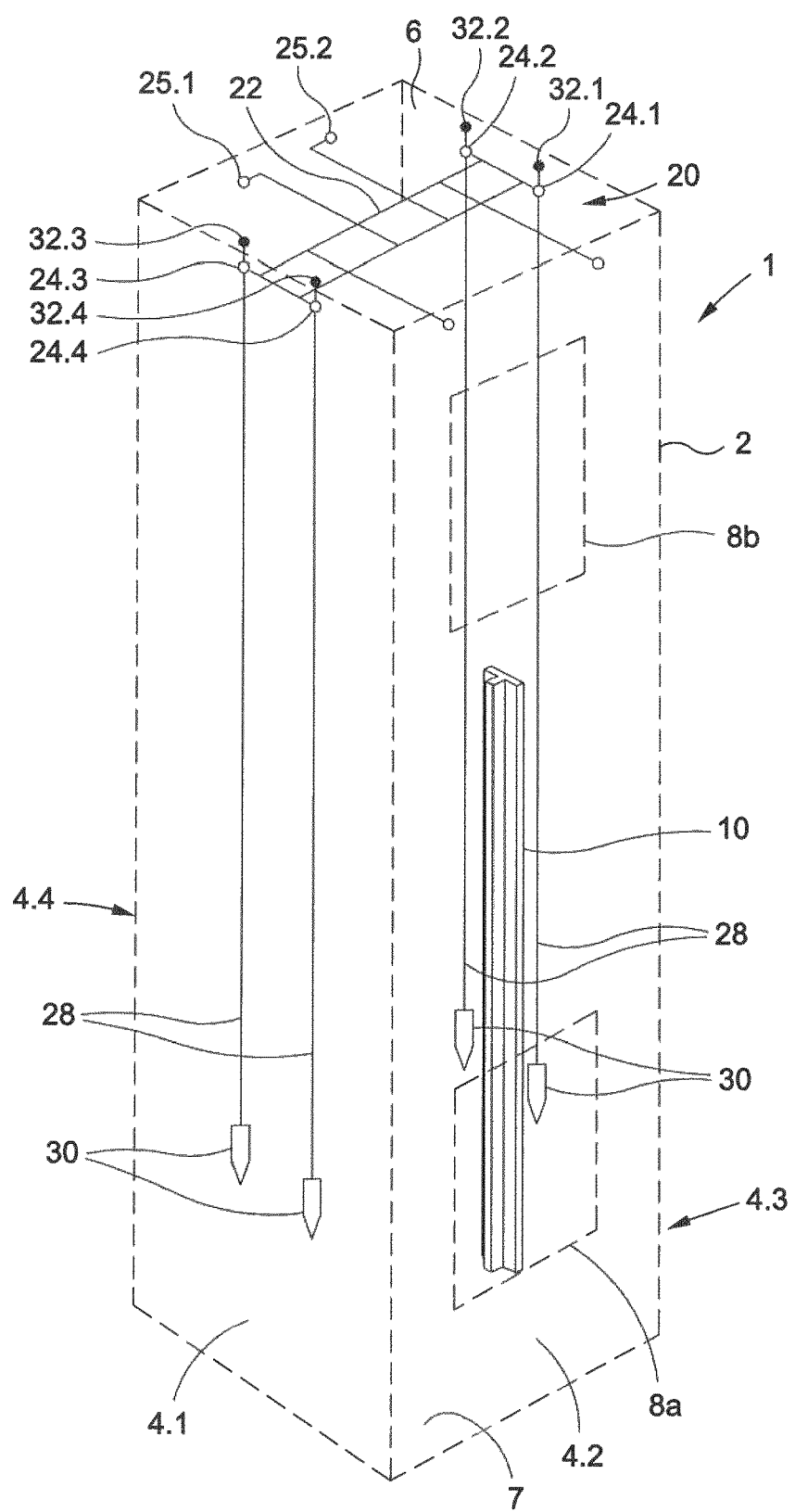
FIG. 1 shows a device, which is arranged in an elevator shaft, for alignment of a component of an elevator installation.

FIG. 1 shows an elevator shaft 2 of an elevator installation 1 during a phase of installing the elevator installation 1, wherein the elevator shaft 2 is illustrated in dashed lines. The elevator shaft 2 has at least one wall 4.1, 4.2, 4.3, 4.4 and a shaft floor 7. The elevator shaft 2 is bounded by the shaft floor 7 and the at least one wall 4.1, 4.2, 4.3, 4.4. In addition, the elevator shaft can be bounded by a shaft ceiling 6. The elevator shaft 2 has a plurality of shaft door openings. Only a lowermost one of the shaft door openings 8*a* and an uppermost one of the shaft door openings 8*b* are illustrated in correspondence with the arrangement thereof in the elevator shaft 2.

A device 20 for aligning components 10 of the elevator installation 1 is arranged in this elevator shaft 2. The device 20 comprises a positioning frame 22 and at least one guide line 28. The guide line 28 serves for the usual vertical alignment of the component 10 of the elevator installation 1, for example of a guide rail. The positioning frame 22 is fixed with respect to the wall 4.2 having the shaft door openings 8*a*, 8*b*. The positioning frame 22 comprises, for example, positioning aids 24.1, 24.2, 24.3, 24.4, 25.1, 25.2. A first pair 24.1, 24.2 and a second pair 24.3, 24.4 of the illustrating positioning aids 24.1, 24.2, 24.3, 24.4, 25.1, 25.2 are provided for alignment of guide rails for guidance of an elevator car of the elevator installation. A third pair 25.1, 25.2 of the illustrated positioning aids 24.1, 24.2, 24.3, 24.4, 25.1, 25.2 is provided for alignment of guide rails for guidance of a counterweight of the elevator installation 1. The at least one guide line 28 is fixed to the shaft ceiling 6 by way of fastening means 32.1, 32.2, 32.3, 32.4. Each of these guide lines 28 is aligned in the elevator shaft 2 by means of the positioning aids 24.1, 24.2, 24.3, 24.4, 25.1, 25.2. In the illustrated example the positioning aids 24.1, 24.2, 24.3, 24.4, 25.1, 25.2 are formed by bores formed in the positioning frame 22, wherein at least one guide line 28 is associated with an individual one of these bores and is guided therethrough. The guide lines 28 each have a plumb-bob 30. This plumb-bob 30 enables perpendicular orientation of the guide line 28 in the elevator shaft 2.

Figure 2:
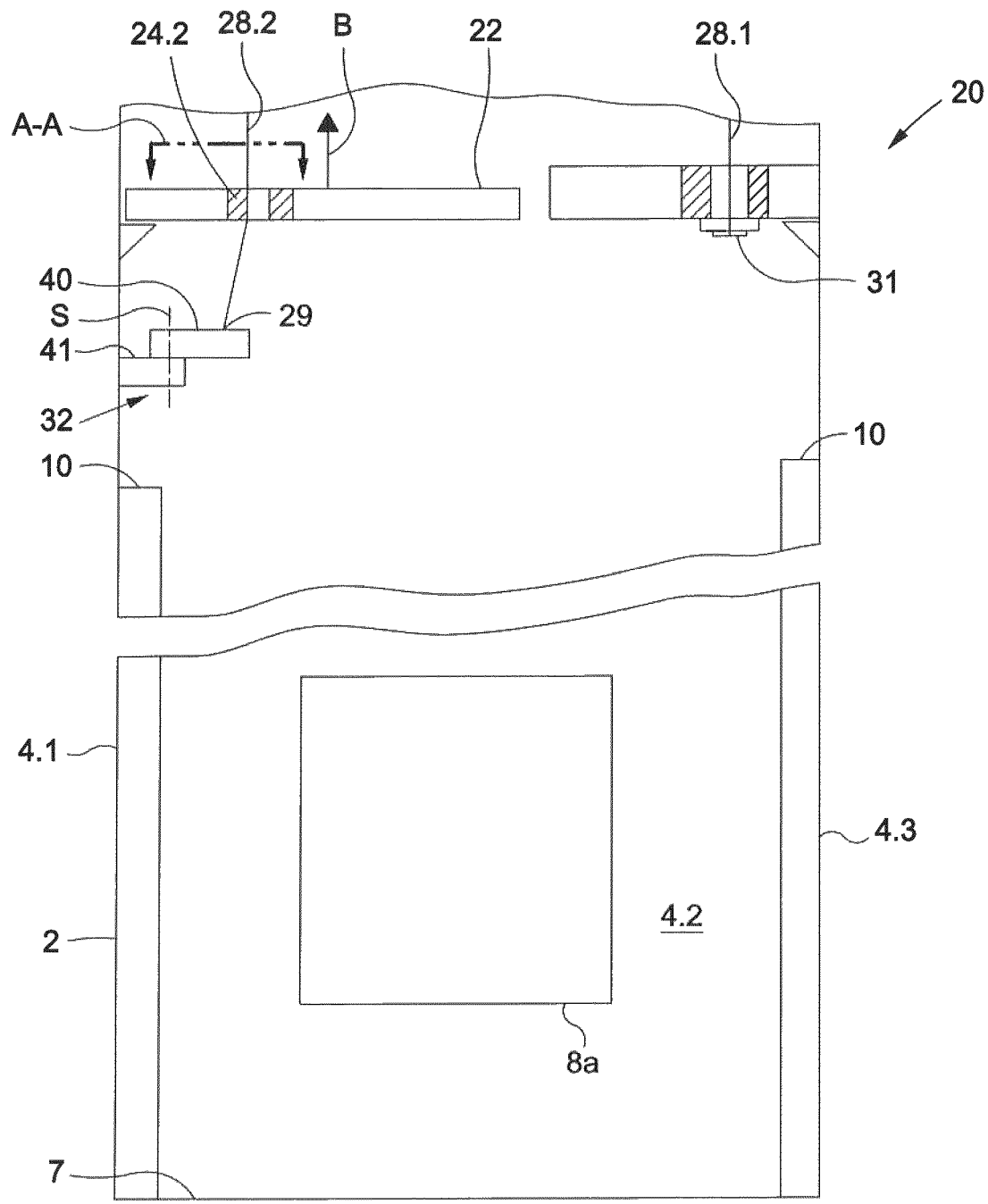
FIG. 2 shows a detail of a device arranged above a lowermost shaft door opening.

FIG. 2 shows two regions of an elevator shaft 2. The illustrated lower region shows a shaft pit, which is arranged above a shaft floor 7, of the elevator shaft 2. The elevator shaft 2 is additionally bounded by walls 4.1, 4.2, 4.3 along the elevator shaft 2. A lowermost shaft door opening 8*a* is arranged above the shaft floor 7 in a first one of the walls 4.2.

The components 10 which need alignment by means of a device 20 for alignment of these components 10 in the elevator shaft are already installed in the lower region of the elevator installation. The device 20 comprising a positioning frame 22 and at least one guide line 28 (28.1, 28.2) is partly shown above these already installed components 10 in the illustrated upper region. An alternative variant (not illustrated) consists of arranging the device 20 in the immediate vicinity of the shaft floor 7 so as to align the entire guide rail 10 by means of the guide line 28.

The positioning frame 22 is fastened in the elevator shaft 2. The positioning frame 22 is fixed with respect to the wall 4.2, which has the shaft door opening 8*a*, of the elevator shaft 2. That also means that the positioning frame 22 is fixed with respect to the wall 4.1 illustrated on the left and also the wall 4.3 illustrated on the right of the elevator shaft 2.

The detail, which is illustrated on the right-hand side in FIG. 2, of the device 20 comprising the positioning frame 22 is constructed in accordance with the known prior art. Accordingly, a first guide line 28.1 of the device 20 is fixed by means of a fastening 31 to the positioning frame 22 itself. By virtue of the fixing of the first guide line 28.1 directly to the positioning frame 22 an increased capability of loading of the positioning frame 22 is necessary. Accordingly, the positioning frame 22 is of a stronger construction at the fastening means 31, which is recognizable in FIG. 2 by a thickness, which is increased by comparison with the positioning frame 22 illustrated on the left-hand side, of the positioning frame 22 illustrated on the right-hand side.

The detail, which is illustrated on the left-hand side in FIG. 2, of the device 20 comprising the positioning frame 22 is constructed in accordance with a form of embodiment of the present invention. A second one of the guide lines 28.2 is fixed to the wall 4.1 by way of a fastening means 32. The fastening means 32 comprises a base 41, which is fastened directly to the wall 4.1, and an arm 40 pivotable at the base 41. The pivotable arm 40 is pivotably mounted on the base 41 in such a way that the second guide line 28.2, which is fastened to the pivotable arm 40, can be aligned with respect to the positioning frame 22. This means that the second guide line 28.2 is only slightly deflected in the immediate vicinity of the positioning aid 24.2 of the positioning frame 22. The second guide line 28.2 is fastened to the pivotable arm 40 at the point 29.

The section B, which is provided for alignment of the component 10, of the second guide line 28.2 is arranged above the positioning frame 22 as indicated by the arrow. Accordingly, not only the first 28.1, but also the second guide line 28.2 can be aligned above the positioning frame 22 by means of a further positioning frame (not illustrated) of the device 20.

Figure 3:
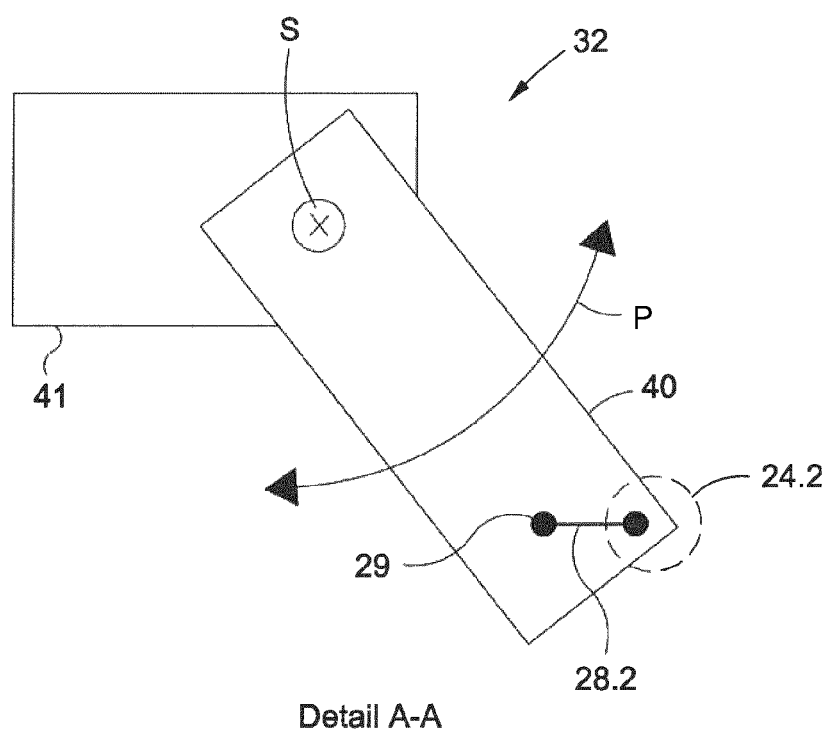
FIG. 3 shows a fastening means of the device shown in FIG. 2.

FIG. 3 shows the fastening means 32, which is illustrated in FIG. 2, of the second guide line 28.2 from a view (A-A) from above in the direction of the shaft pit of the elevator shaft. The arm 40 is pivotable about the axis S by means of the pivot movement P. The guide line 28.2 is not vertically guided from the point 29, for example, to the positioning aid 24.2. From the positioning aid 24.2 the guide line 28.2 runs substantially vertically upwardly along the section B illustrated in FIG. 2.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method of installing a component of an elevator installation having an elevator shaft, the method comprising the steps of:
    aligning and fixing a positioning frame in the elevator shaft with respect to a wall of the elevator shaft, which wall bounds the elevator shaft;
    fixing a guide line in the elevator shaft separately from the positioning frame, where the elevator shaft has a plurality of shaft door openings and wherein the positioning frame and the guide line are fixed above a lowermost one of the shaft door openings and below an uppermost one of the shaft door openings in the elevator shaft;
    aligning the guide line in the elevator shaft using the positioning frame; and
    aligning the component using the aligned guide line.

2. The method according to claim 1 including fixing the guide line in the elevator shaft with a fastening means and wherein a section of the guide line between the fastening means and the positioning frame is unaligned with a remainder of the guide line.

3. The method according to claim 2 wherein the fastening means is configured to enable the guide line to be loaded with a tensioning force of at least 300 N.

4. The method according to claim 2 wherein the fastening means includes a base and an arm pivotable at the base, the arm being pivoted to align the guide line with respect to a positioning aid of the positioning frame.

5. The method according to claim 1 wherein a first end of the guide line is fixed to the wall of the elevator shaft.

6. The method according to claim 1 wherein a section of the guide line adapted for alignment of the component is arranged above the positioning frame.

7. The method according to claim 1 wherein an end of the guide line is fixed to a shaft ceiling of the elevator shaft or to a shaft floor of the elevator shaft.

8. The method according to claim 1 wherein the guide line is adapted for aligning a guide rail in the elevator shaft for guidance of an elevator car of the elevator installation or for guidance of a counterweight of the elevator installation.

9. A device for aligning a component of an elevator installation while installing the component, comprising:
    a positioning frame adapted to be fixed in an elevator shaft of the elevator installation with respect to a wall that bounds the elevator shaft; and
    a guide line adapted to be fixed in the elevator shaft separately from the positioning frame, wherein the elevator shaft has a plurality of shaft door openings and wherein the positioning frame and the guide line are fixed above a lowermost one of the shaft door openings and below an uppermost one of the shaft door openings in the elevator shaft, and wherein when the positioning frame and the guide line are fixed in the elevator shaft, the positioning frame aligns the guide line in the elevator shaft.

10. The device according to claim 9 including a fastening means fixing the guide line in the elevator shaft, the fastening means including a base and an arm pivotable at the base, the arm being pivoted to align the guide line with respect to a positioning aid of the positioning frame.

11. A method of installing a component of an elevator installation having an elevator shaft, the method comprising the steps of:
    aligning and fixing a positioning frame in the elevator shaft with respect to a wall of the elevator shaft, which wall bounds the elevator shaft;
    fixing a guide line in the elevator shaft separately from the positioning frame using a fastening means which includes a base and an arm pivotable at the base;
    aligning the guide line in the elevator shaft by pivoting the arm to align the guide line with respect to a positioning aid of the positioning frame, wherein a section of the guide line between the fastening means and the positioning frame is unaligned with a remainder of the guide line; and
    aligning the component using the aligned guide line.

12. A device for aligning a component of an elevator installation while installing the component, comprising:
    a positioning frame adapted to be fixed in an elevator shaft of the elevator installation with respect to a wall that bounds the elevator shaft;
    a guide line adapted to be fixed in the elevator shaft separately from the positioning frame; and
    a fastening means fixing the guide line in the elevator shaft, the fastening means including a base and an arm pivotable at the base, the arm being pivoted to align the guide line in the elevator shaft with respect to a positioning aid of the positioning frame.

* * * * *